United States Patent [19]

Onoda et al.

[11] Patent Number: 5,104,132
[45] Date of Patent: Apr. 14, 1992

[54] PISTON RING HAVING NITRIDING LAYER AND COMPOSITE NI-B PLATING LAYER

[75] Inventors: Motonobu Onoda; Takeji Tsuchiya, both of Yono, Japan

[73] Assignee: Nippon Piston Ring Co., Ltd., Tokyo, Japan

[21] Appl. No.: 668,828

[22] Filed: Mar. 13, 1991

[30] Foreign Application Priority Data

Apr. 23, 1990 [JP] Japan .................................. 2-106860

[51] Int. Cl.⁵ .............................................. B65D 53/00
[52] U.S. Cl. .......................... 277/235 A; 277/DIG. 6
[58] Field of Search .................. 92/169.1; 277/235 A, 277/223, 224, DIG. 6

[56] References Cited

U.S. PATENT DOCUMENTS

| | | | |
|---|---|---|---|
| 4,077,637 | 3/1978 | Hyde et al. | 277/235 A |
| 4,079,720 | 3/1978 | Takahashi | 92/169.1 |
| 4,359,230 | 11/1982 | Bruni | 277/235 A |
| 4,570,946 | 2/1986 | Tsuchiya et al. | 277/235 A |
| 4,579,355 | 4/1986 | Kooroki | 277/235 A |
| 4,681,817 | 7/1987 | Shiwada | 277/235 A |
| 4,941,669 | 7/1990 | Fujisawa et al. | 277/235 A |

FOREIGN PATENT DOCUMENTS 0024613 2/1977 Japan ................................... 277/235

Primary Examiner—Edward K. Look
Assistant Examiner—Thomas Denion
Attorney, Agent, or Firm—Sughrue, Mion, Zinn Macpeak & Seas

[57] ABSTRACT

A piston ring for use in an internal combustion engine. The piston ring includes a base body, a nitriding layer formed at an outer peripheral surface portion of the base body, and a composite Ni-B diffusion plating layer formed over the nitriding layer. The composite Ni-B diffusion plating layer has a thickness ranging from 0.5 to 20 micron meters. Since the nitriding layer is provided on at least the sliding surface of the piston ring, high durability of the piston ring can be attained because of the high wear resistivity of the nitriding layer. Further, since a Ni-Bi composite dispersion plating layer is formed over the nitriding layer, abnormal wearing due to scuffing is avoidable at an initial working phase because of the high scuffing resistance of the composite plating layer.

7 Claims, 2 Drawing Sheets

HEAT TREATMENT TEMPERATURE (°C×hr)

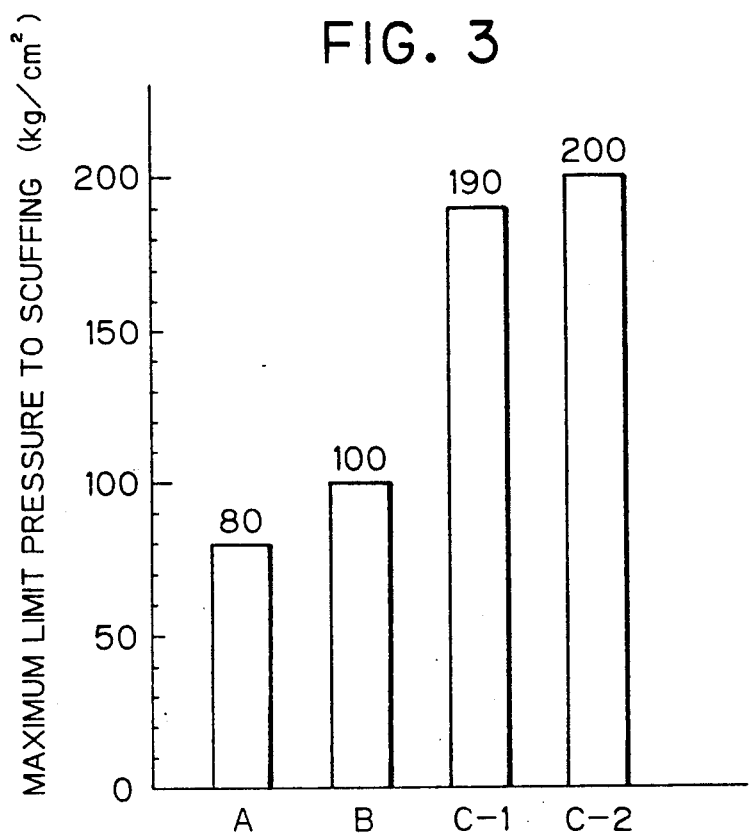
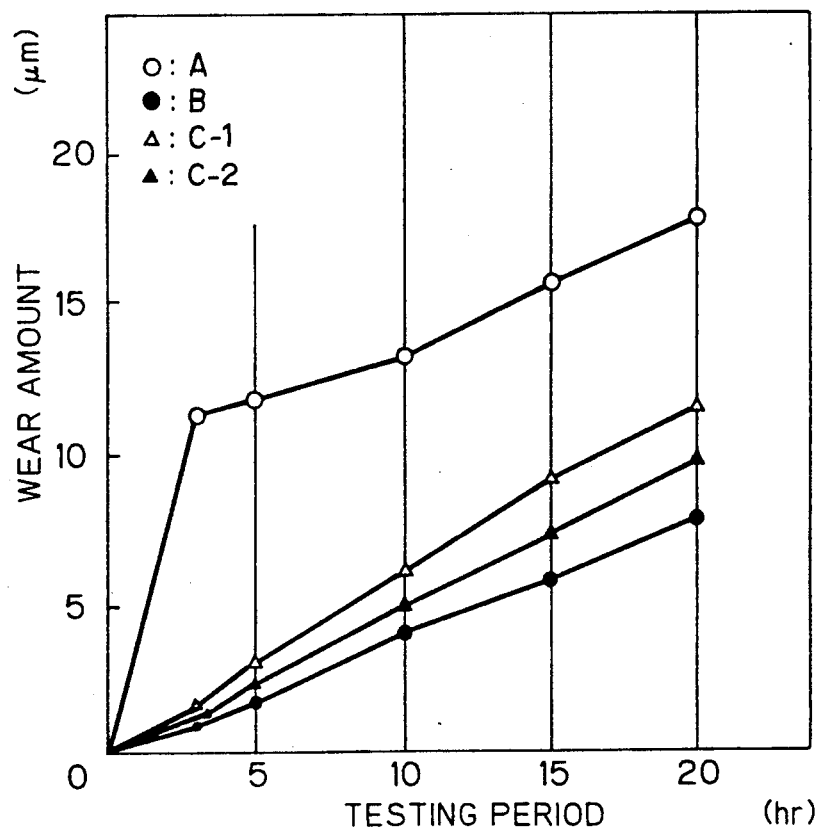

PISTON RING HAVING NITRIDING LAYER AND COMPOSITE NI-B PLATING LAYER

BACKGROUND OF THE INVENTION

The present invention relates to a piston ring for use in an internal combustion engine, and more particularly, to a type thereof in which improvement is made on a sliding characteristic at an initial operation stage of the engine.

In accordance with a recent demand in light weight and high output engine, high quality is required in the piston ring. In this respect, conventionally, a sliding surface of the piston ring has undergone several treatment so as to impart wear resistance thereon in order to prolong durability or service life thereof. For example, high hardness chromium plating layer or sprayed layer is provided on the sliding surface of the piston ring. Alternatively, nitriding treatment is effected to the sliding surface.

Among these treatments, the nitriding treatment provides superior wear resistivity, and therefore, the piston ring having nitriding layer have been widely used under a severe working or operating conditions.

However, even though the nitriding layer has excellent wear resistivity, the layer would be insufficient in view of thermal seizure or scuffing resistivity in comparison with the high hardness chromium plating or sprayed layer. Accordingly, further improvement must be made on the piston ring having the nitriding layer in an aspect of abnormal wearing or scuffing occurred under the severe engine working condition.

SUMMARY OF THE INVENTION

It is therefore, an object of the present invention to provide an improved piston ring having sufficient wear resistivity as well as thermal seizure or scuffing resistivity, and capable of maintaining these resistivities even in the use of the piston ring under the severe working condition.

This and other objects of the invention will be attained in the present invention by providing a piston ring for use in an internal combustion engine comprising a base body having an outer peripheral surface portion, a nitriding layer formed at the outer peripheral surface portion, and a composite Ni-B diffusion plating layer formed over the nitriding layer, the composite Ni-B diffusion plating layer having a thickness ranging from 0.5 to 20 micron meters.

In accordance with the present invention, since the nitriding layer is provided on at least the sliding surface of the piston ring by the nitriding treatment, high durability of the piston ring can be attained because of the high wear resistivity of the nitriding layer. Further, since Ni-B composite diffusion plating layer is formed over the nitriding layer, abnormal wearing due to scuffing is avoidable at an initial working phase because of the high scuffing or thermal seizure resistance of the composite plating layer.

BRIEF DESCRIPTION OF THE DRAWINGS

In the drawings;

FIG. 3 is a graph showing maximum limit pressure to scuffing with respect to several samples; and FIG. 4 is a graph showing the relationship between testing period and wear amount with respect to the several samples.

DETAILED DESCRIPTION OF THE PREFERRED EMBODIMENT

Figure 1:
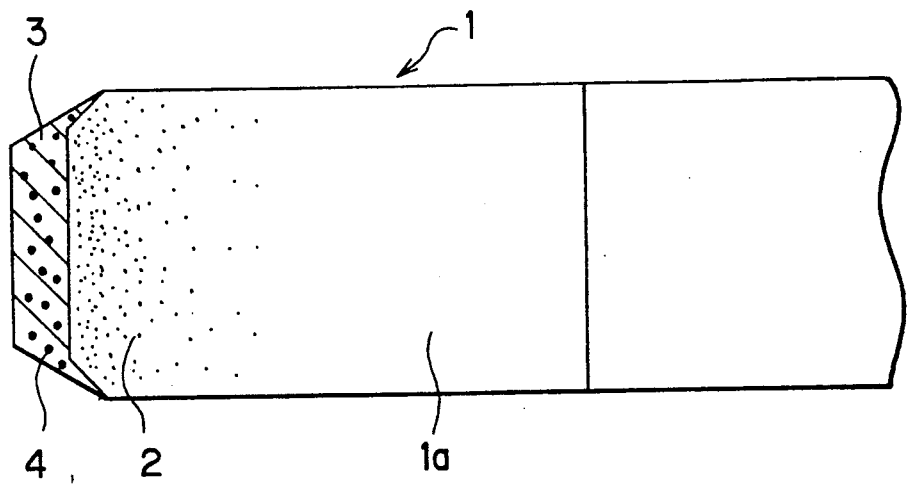
FIG. 1 is an enlarged cross-sectional view showing a piston ring according to one embodiment of this invention.

A piston ring according to one embodiment of this invention is shown in FIG. 1. The piston ring 1 has a base body 1a, a wear resistant nitriding layer 2 formed at an outer peripheral surface of the base body 1a, and a composite Ni-B diffusion plating layer 3 formed upon the nitriding layer 2. The base body 1a is formed of steel whose kind is suitable for undergoing nitriding treatment, after which obtainable is the nitriding layer having sufficient wear resistivity. For example, chromium steel material containing from 0.16 to 1.30 wt % of carbon and from 12 to 19 wt % of chromium would be preferable. Alternatively, the steel material further containing molybdenum vanadium, or both is also preferable. Moreover, also available is other chromium steel in which contained are from 1.0 to 1.4 wt % of carbon, from 13 to 16 wt % of chromium and from 0.2 to 1.0 wt % of at least on material selected from the group consisting of molybdenum and vanadium.

These steel materials can provide the nitriding layer 2 having sufficient wear resistivity. Therefore, by forming the nitriding layer 2 at the sliding surface of the steel base body 1a, excellent wear resistivity of the ring is obtainable because of inherent characteristic of the nitriding layer 2.

However, as described above, the nitriding layer may be insufficient with respect to the thermal seizure resistivity or scuffing resistance. Particularly, at the initial start up period of the internal combustion engine, abnormal wearing may occur in the piston ring only with the provision of the nitriding layer 2. Therefore, in the piston ring of this invention, the composite Ni-B diffusion plating layer 3 is further provided over the outer peripheral surface of the nitriding layer 2 in order to compensate inherent deficiency of the nitriding layer 2. This plating layer 3 has small thickness such as from 0.5 to 20 micron meters. The plating layer 2 enhances initial break-in property of the piston ring at the initial start-up period of the engine.

Details of the composite Ni-B diffusion plating layer 3 will be described. The plating layer has a base matrix formed of a nickel alloy containing from 0.1 to 10 wt % of boron, and diffusion material diffused into the base alloy matrix. The diffusion material is formed of high hardness particles such as metal nitride, metal carbide and metal oxide. This type of plating layer has a given wear resistivity and has high thermal seizure or scuffing resistivity, the latter resistivity being far superior to that of the nitriding layer or a conventional high hardness chromium plating layer.

If the composite diffusion plating layer 3 is too small in thickness, the layer 3 may disappear or be worn out before exhibiting its initial break-in property. Therefore, the thickness of the layer 3 must be not less than 0.5 micron meters. On the other hand, if the thickness is too large, production cost is increased, and the plating layer may be easily peeled off from the internal nitriding layer 2. Further, large wear amount of the sliding surface (plating layer 3) results due to the large thickness until provided is a case where the internal nitriding layer is exposed to the sliding surface to perform its inherent wear resisting function. Due to the excessive wear, gap distance at a lip portion of the piston ring may be increased at an early stage, and therefore, fluid tight characteristic of the piston ring may be degraded at an early operational phase. Thus, in the present embodiment, the thickness of the composite diffusion plating layer is not more than 20 micron meters, and preferably not more than 10 micron meters.

Further, in more preferable form, the composite diffusion plating layer 3 can provide the wear resistance substantially the same as that of the nitriding layer 2, if from 5 to 30 volume % of high hardness particles 4 having particle size of from 0.1 to 10 micron meters are contained in the nickel alloy matrix which contains from 0.1 to 10 wt % of boron, the high hardness particles being at least one of the metal nitride, metal carbide and metal oxide. With this arrangement, wear amount at an initial use of the piston ring can be reduced at low level.

Boron effectively increase hardness of the base matrix of the plating layer, contribute to the wear resisting function. To achieve this function, the boron content is preferably not less than 0.1 wt %. However, if the content exceeds 10 wt %, the base matrix becomes brittle. Therefore, the boron content is from 0.1 to 10 wt %.

As the materials of the high hardness particles 4, $Si_3N_4$, SiC, WC, $Al_2O_3$, $ZrO_2$ and $Cr_2O_3$ are available. The diffusion rate and particle size may be dependent on the resultant thickness of the plating layer 3. However, the particle size of the high hardness particles is preferably from 0.1 to 10 micron meters, and these particles has volume percent of from 5 to 30 vol %. If the particle size is not more than 0.1 micron meters, and volumetric percent is not more than 5 vol %, sufficient wear resistance of the resultant plating layer cannot be obtained. On the other hand, if the particle size exceeds 10 micron meters, and the volumetric percent exceeds 30 vol %, particle bonding strength to the alloy matrix may be lowered, and further, resultant plating layer may attack an opponent sliding member which leads to excessive wear in the opponent member. Thus, the particle size and volume must be within the above described ranges.

Figure 2:
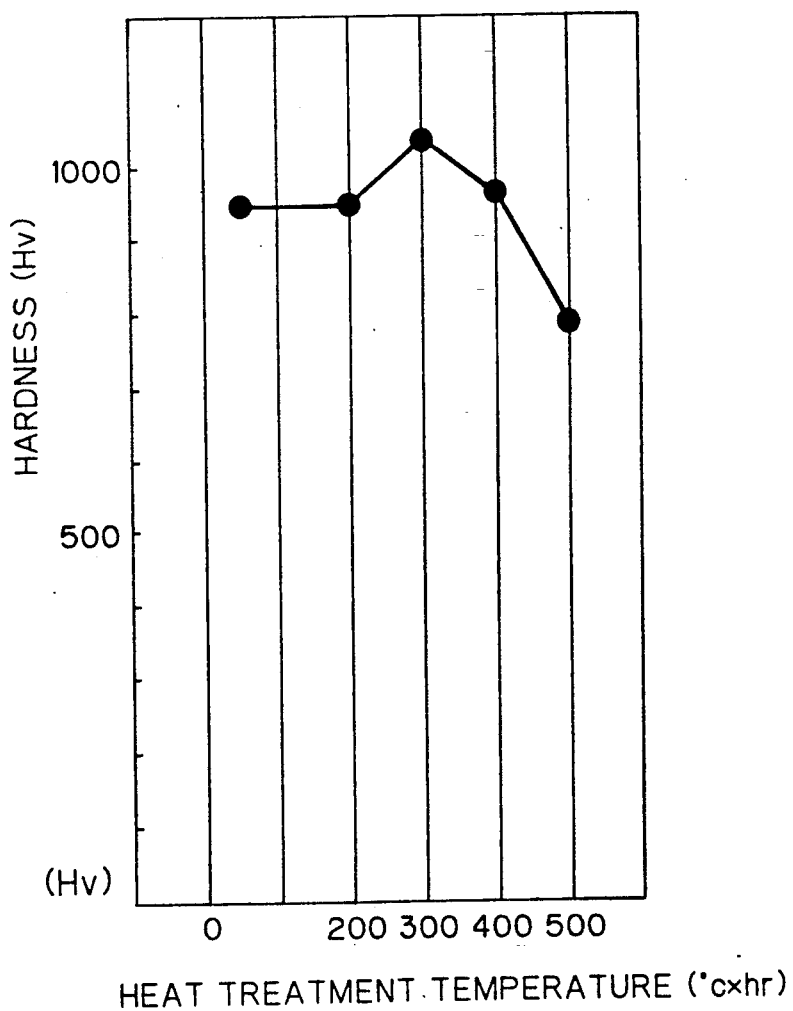
FIG. 2 is a graphical representation showing the relationship between heat treatment temperature and hardness of a composite diffusion plating layer.

Comparative experiments have been conducted with respect to wear resistivity and scuffing resistance of the piston ring.
  (1) Piston ring base body: SUS 440B steel (defined by JIS, and containing 0.75 to 0.95 wt % of C, not more than 1.0 wt % of Si, not more than 1.0 wt % of Mn, not more than 0.04 wt % of P, not more than 0.6 wt % of Ni, 16.0 to 18.0 wt % of Cr, not more than 0.75 wt % of Mo, and balance Fe)
  (2) Sample A: high hardness chromium plating layer having a thickness of 100 micron meters was formed over the piston ring base body.
  (3) Sample B: Nitriding treatment was effected to the piston ring body so that a nitriding layer having a thickness of 100 micron meters was obtained.
  (4) Sample C (present invention): Nitriding treatment was effected to the piston ring body to obtain the nitriding layer having a thickness of 100 micron meters, and further, a composite diffusion plating layer having a thickness of 10 micron meters was formed over the nitriding layer. In the plating layer, 10 vol % of silicon nitride ($Si_3N_4$) having particle size of 0.3 micron meters was dispersed in the nickel matrix containing 5 wt % of boron. Hardness change in accordance with the various heat treatment conditions was further tested with respect to the Sample C. The test result is shown in FIG. 2. The Sample C was kept intact for referring as Sample C-1. Further, the Sample C was subjected to heat treatment at a temperature of 300° C. for 1 hours to provide a Sample C-2. According to a graph shown in FIG. 2, high hardness was obtained in case of the Ni-B composite diffusion plating layer heat-treated at the temperature of 300° C.

Scuffing resistance tests were conducted with using rotary disc type plane contact slide wear testing machine. Condition details were as follows:
  Lubricating oil: mixture of SAE #30 (50 %) and white kerosene
  Oil temperature: 50° C.
  Lubricating oil supply amount: 0/02 liters/min.
  Peripheral velocity: 3.75 m/sec. (300 r.p.m.)
  Planar pressure: 25 kg/cm²
  Opponent member; FC 25 ($H_{RB}98$, and defined by JIS)

Under the condition, idling operation was carried out for 20 minutes, and thereafter, lubrication oil supply was stopped. Then, pressure of 30 kg/cm² was initially applied to the samples, and the pressure was added by 10 kg/cm² at every 2 minutes until the scuffing occurred. The pressure at which scuffing occurred was regarded as the maximum limit pressure to scuffing, which is shown in FIG. 3.

As is apparent from FIG. 3, maximum limit pressure to scuffing in case of the Samples C-1 and C-2 were far greater than that of Samples A and B in which conventional high hardness chromium plating layer or mere nitriding layer was formed.

Next, wear resistance tests were also conducted with using Amsler's wear resting machine. The testing condition was as follows:
  Lubricating oil: SAE #10W30
  Oil temperature: room temperature
  Peripheral velocity: 0.89 m/sec. (500 r.p.m.)
  Load: 60 kg
  Sliding period: 3 hours, 5 hours, 10 hours, 15 hours, 20 hours
  Opponent member: FC 25 ($H_{RB}98$)

In the wear resistance tests, the opponent member was formed in a rotary shape, and half portion thereof was dipped in the lubricating oil. Each of the samples was stationarily held and was urged to the rotating opponent piece. Wear amount was measured by a surface roughness tester in which frictional wear stepped profile was evaluated as the wear amount (micron meters).

Test result is shown in FIG. 4. According to a graph shown in FIG. 4, the sample A whose sliding surface was formed with the high hardness chromium plating layer provided great amount of frictional wear. In contrast, the samples C-1 and C-2 provided the frictional wear amounts approximately similar to that seen in Sample B in which the sliding surface was provided with the nitriding layer, and wearing mode with time in Samples C-1 and C-2 were also similar to that of the Sample B. Thus, the Samples C-1 and C-2 provided sufficient wear resistivity.

In view of the foregoing, according to the piston ring of this invention for use in the internal combustion engine, the thin composite diffusion plating layer having sufficient scuffing resistivity as well as wear resistivity is formed, which particularly exhibits sufficient initial break-in property, over the wear resistant nitriding layer. Therefore, scuffing or thermal seizure which might occur at the initial operational phase of the engine can be effectively obviated, and prolonged durability or service life of the piston ring is obtainable.

While the invention has been described in detail and with reference to specific embodiment thereof, it would be apparent to those skilled in the art that various changes and modifications may be made therein without departing from the spirit and scope of the invention.

What is claimed is:

1. A piston ring comprising:
  a base body having an outer peripheral surface portion;
  a nitriding layer formed at the outer peripheral surface portion; and
  a composite Ni-B diffusion plating layer consisting of Ni and B formed over the nitriding layer, the composite Ni-B diffusion plating layer having a thickness ranging from 0.5 to 20 micron meters.

2. The piston ring as claimed in claim 1, wherein the composite Ni-B diffusion plating layer consists essentially of a nickel alloy matrix containing from 0.1 to 10 wt % of boron, and from 5 to 30 % by volume of high hardness particles dispersed in the nickel alloy matrix, the high hardness particles having particle size ranging from 0.1 to 10 micron meters.

3. The piston ring as claimed in claim 2, wherein the high hardness particles are made of at least one material selected from the group consisting of metal carbide, metal nitride and metal oxide.

4. The piston ring as claimed in claim 3, wherein the composite Ni-B diffusion plating layer has a thickness ranging from 0.5 to 10 micron meters.

5. The piston ring as claimed in claim 4, wherein the base body comprises a chromium steel.

6. The piston ring as claimed in claim 5, wherein the chromium steel consists essentially of from 0.16 to 1.30 wt % of carbon, from 12 to 19 wt % of chromium and balance iron.

7. The piston ring as claimed in claim 5, wherein the chromium steel consists essentially of from 1.0 to 1.4 wt % of carbon, from 13 to 16 wt % of chromium and from 0.2 to 1.0 wt % of at least one material selected from the group consisting of molybdenum and vanadium, and balance iron.

* * * * *